United States Patent
Gruebel et al.

(10) Patent No.: US 10,637,318 B2
(45) Date of Patent: Apr. 28, 2020

(54) ACTIVE PART FORMED AS A ROTOR OR STATOR, A METHOD FOR PRODUCING THE ACTIVE PART, AND AN ELECTRICAL MACHINE

(71) Applicant: Siemens Aktiengesellschaft, Munich (DE)

(72) Inventors: Andre Gruebel, Fuerth (DE); Dieter Schirm, Breitenguessbach (DE)

(73) Assignee: Siemens Aktiengesellschaft, Munich (DE)

( * ) Notice: Subject to any disclaimer, the term of this patent is extended or adjusted under 35 U.S.C. 154(b) by 439 days.

(21) Appl. No.: 15/514,955

(22) PCT Filed: Sep. 17, 2015

(86) PCT No.: PCT/EP2015/071365
§ 371 (c)(1),
(2) Date: Mar. 28, 2017

(87) PCT Pub. No.: WO2016/050528
PCT Pub. Date: Apr. 7, 2016

(65) Prior Publication Data
US 2018/0241271 A1  Aug. 23, 2018

(30) Foreign Application Priority Data
Sep. 29, 2014 (EP) .................................. 14186857

(51) Int. Cl.
*H02K 3/30* (2006.01)
*H02K 3/38* (2006.01)
(Continued)

(52) U.S. Cl.
CPC ............... *H02K 3/38* (2013.01); *B29C 70/28* (2013.01); *H02K 3/30* (2013.01); *H02K 3/34* (2013.01);
(Continued)

(58) Field of Classification Search
CPC ............ H02K 3/30; H02K 3/32; H02K 3/345; H02K 3/38; H02K 15/12; H02K 15/125; B29C 70/28
(Continued)

(56) References Cited

U.S. PATENT DOCUMENTS 2,820,914 A * 1/1958 Rudoff ..................... H02K 3/30
310/43
4,616,407 A  10/1986 Tamaki et al.
(Continued)

FOREIGN PATENT DOCUMENTS

CN           1893232         1/2007
CN         202949296 U       5/2013
(Continued)

OTHER PUBLICATIONS

Office Action dated Jun. 28, 2019 issued in India Patent Application No. 201737008047.

*Primary Examiner* — Quyen P Leung
*Assistant Examiner* — Eric Johnson
(74) *Attorney, Agent, or Firm* — Cozen O'Connor

(57) ABSTRACT

An active part of an electrical machine, such as a rotor or a stator, an electrical machine having the active part, which has a main body and a winding that is surrounded by an encapsulation compound, where the encapsulation compound has at least three regions, where the winding extends through the main body in a slot in a first region, where the winding surrounded by the encapsulation compound projects out of the main body at least in a third region, and which has at least a second region arranged between the first region and the third region in the active part, where the encapsulation compound has a different composition in the second region than in the first region or the third region.

19 Claims, 4 Drawing Sheets

(51) Int. Cl.
*H02K 15/12* (2006.01)
*B29C 70/28* (2006.01)
*H02K 3/34* (2006.01)
*B29K 105/16* (2006.01)
*B29L 31/00* (2006.01)

(52) U.S. Cl.
CPC .......... *H02K 15/12* (2013.01); *B29K 2105/16* (2013.01); *B29L 2031/7498* (2013.01)

(58) Field of Classification Search
USPC .................................................. 310/43, 45
See application file for complete search history.

(56) References Cited

U.S. PATENT DOCUMENTS

| | | | |
|---|---|---|---|
| 8,097,996 B1 | 1/2012 | Dantam | |
| 2003/0001440 A1* | 1/2003 | Bourqui | H02K 3/30 310/43 |
| 2006/0218777 A1 | 10/2006 | Swift et al. | |
| 2009/0273254 A1 | 11/2009 | Heim | |
| 2010/0234520 A1* | 9/2010 | Morita | C08L 63/00 524/540 |
| 2012/0025646 A1* | 2/2012 | Sheeran | H02K 3/30 310/88 |
| 2014/0084713 A1* | 3/2014 | Kurahara | H02K 3/30 310/45 |
| 2015/0318770 A1 | 11/2015 | Behrendt | |

FOREIGN PATENT DOCUMENTS

| | | |
|---|---|---|
| DE | 197 15 920 A1 | 10/1997 |
| DE | 10 2008 003 784 A1 | 7/2009 |
| DE | 10 2012 021 494 A1 | 5/2014 |
| EP | 2 113 991 A1 | 11/2009 |
| FR | 2 538 181 A1 | 6/1984 |
| RU | 2187874 | 8/2002 |
| RU | 106055 | 6/2011 |
| WO | WO 2012/015859 | 2/2012 |

* cited by examiner

ACTIVE PART FORMED AS A ROTOR OR STATOR, A METHOD FOR PRODUCING THE ACTIVE PART, AND AN ELECTRICAL MACHINE

CROSS-REFERENCE TO RELATED APPLICATIONS

This is a U.S. national stage of application No. PCT/EP2015/071365 filed 17 Sep. 2015. Priority is claimed on European Application No. 14186857.0 filed 29 Sep. 2014, the content of which is incorporated herein by reference in its entirety.

BACKGROUND OF THE INVENTION

1. Field of the Invention

The invention relates to an active part of an electrical machine, in particular a stator and a rotor, and further relates to a method for producing such an active part, as well as an electrical machine comprising such an active part.

2. Description of the Related Art

For simple insulation of live conductors, i.e., windings, in a rotor or a stator, the conductors are encapsulated by a resin (encapsulation compound) after being introduced into the stator and/or rotor. In this case, the windings are introduced into a laminated core (main body).

Such encapsulated stators are disclosed, for example, in DE 10 2008 003 784 A1. This publication describes how a pourable encapsulation compound is used for producing such a stator.

DE 197 15 920 A1 further discloses a method for forming a stator assembly, where the stator windings are impregnated with an epoxy resin after being positioned.

EP 2 113 991 A1 discloses an encapsulated stator comprising windings and a method for producing such a stator.

SUMMARY OF THE INVENTION

It is an object of the present invention to provide an active part with improved properties.

This and other objects and advantages are achieved in accordance with the invention by an active part, particularly a rotor or a stator, an electrical machine, in particular a dynamo-electric machine, and a method for producing such an active part, wherein the active part includes a main body and a winding surrounded by an encapsulation compound having at least three regions, where the winding extends through the main body in a slot in a first region, where the winding surrounded by the encapsulation compound projects out of the main body at least in a third region, where at least one second region (9b) is arranged between the first region and the third region, and where the encapsulation compound has a different composition in the second region from the encapsulation compound in the first region and/or the third region. Within the context of the present invention, "active part" is understood as a stator or a rotor, in particular of an electrical machine. An active part, however, may also be a transformer (voltage converter) or a coil with a main body (core). Generally, an active part of an electrical machine is a part that provides an (active) contribution to the function of the electrical machine.

"Main body" is understood, for example, as a laminated core. A main body may also comprise a component that is manufactured as solid, such as a coil main body, a body consisting of ferrite, which has recesses/at least one slot, in particular for at least one winding.

"Slot" is understood as a recess in the main body, where the slot generally extends on the radially extending surface of the active part. The slot extends in a main body, namely generally in the rotational direction of the main body and/or through an axis of symmetry of the main body, but other paths are also conceivable. A slot is also conceivable as an opening through the main body, generally in the rotational direction.

Instead of a winding, a metal rod may also be understood, where the metal rod serves to induce a magnetic field.

"Encapsulation compound" is understood as a chemical compound which, in particular after a curing process, forms a solid material. Curing may be a process that is performed chemically and occurs via a curing agent and/or the action of heat. A different composition of the encapsulation compound relates, for example, to an increased concentration of a flexibilizer or a softener. A different composition is also present in the use of different encapsulation compounds.

"First region" is understood as a region of the encapsulation compound that is located in a recess of the main body. In the case of a winding in a laminated core, windings are generally introduced into a slot (a recess) of the main body (laminated core). The boundaries of the first region do not necessarily have to extend at the ends of the slot, they may also be displaced inwardly and/or optionally outwardly. Optionally, in at least one direction a fixed boundary is not able to be specified.

The "third region" is the region of the encapsulation compound that encloses the part of the winding that extends outside the main body.

In the case of a stator of an electrical machine, the encapsulation compound has at least two third regions. The third regions extend, for example, from the outer end of the encapsulation compound on the one side and, on the other side, as far as a boundary at which the opening of the slot (slot boundary) extends at a distance from the main body.

A "second region" is a region of the encapsulation compound around the winding that is located in the region of an end of the slot in the main body. In other words, the second region is the region of the encapsulation compound that is inwardly and outwardly spaced apart from the slot boundary. A conventional active part of an electrical machine generally has two second regions that adjoin the first region.

Third regions are, in particular, regions of the encapsulation compound which are located around the regions of the ends of the windings. Third regions are generally located at the axial outer edges of the encapsulation compound.

The second region may be arranged between the first region and the third region. The second region may also extend so as to circulate around the front face of the main body/active part. The second region may also overlap with parts of the first region and of the third region. The second region generally adjoins the first region and the third region.

In other words, a feature of the invention is that in regions denoted here as second regions, which in particular are subjected to specific loading, the encapsulation compound has an increased resilience and, as a result, mechanical stresses do not lead to adverse effects such as fracture or cracks, as in a brittle encapsulation compound.

A mechanical stress occurs, in particular, due to thermal influences, where the mechanical stresses in the normal case result from the variable expansion of the winding, the encapsulation compound and/or the main body. Furthermore, vibrations, oscillations or mechanical stresses may particularly occur due to operating loads.

The specific loading at the boundaries of the slot and/or in the vicinity of the openings of the active part is countered by the choice of an encapsulation compound that is specifically suitable therefor.

As described hereinafter, a relative reduction in the modulus of elasticity and/or the toughness of the encapsulation compound increases the durability of the active part.

An alteration to the toughness of the encapsulation compound, in the case of an amorphous encapsulation compound, may also correspond to an increase in the viscosity of the encapsulation compound.

Applications of the invention are, for example, a stator and/or a rotor of an electrical machine, an electromagnet, a voltage converter or a transformer. The invention is particularly well suited to relieving the load from a rotor and/or a stator having at least one laminated core and at least one winding, which is integrated in an encapsulation compound, at the slot boundary.

In one advantageous embodiment, the encapsulation compound in the second region has a different modulus of elasticity from that in the first region and/or the third region.

In a further advantageous embodiment, the encapsulation compound in the second region has a different toughness from that in the first region and/or the third region.

Generally, the composition of the encapsulation compound provides a way to alter the modulus of elasticity/the toughness of the encapsulation compound. The modulus of elasticity/the toughness (and the viscosity) can, for example, be altered by an addition of a softener or a flexibilizer. The toughness of the encapsulation compound is generally increased by the use of a softener. Furthermore, at least a partial replacement of one encapsulation compound with a different encapsulation compound (with a different modulus of elasticity/with a different toughness) is able to alter the modulus of elasticity/toughness of the encapsulation compound.

An increased toughness of the encapsulation compound reduces the tendency to crack formation. An encapsulation compound having a different chemical composition may also be used for altering the toughness and/or the modulus of elasticity of the encapsulation compound.

In one embodiment of the invention, the second region is the region at which the modulus of elasticity of the encapsulation compound is initially reduced from the end of the first region and adopts a minimum value in the vicinity of a slot boundary. From the minimum modulus of elasticity, the modulus of elasticity of the encapsulation compound optionally increases further.

In a further advantageous embodiment, the encapsulation compound in the second region has a reduced modulus of elasticity (and/or an increased toughness) from that of the encapsulation compounds in the first region and/or the third region.

By the use of an encapsulation compound with a reduced modulus of elasticity and/or an increased toughness, the active part is more resistant in the regions where the active part is loaded by mechanical stresses due to thermal expansion. The mechanical stresses are caused by the different coefficients of expansion of the different materials.

In a further advantageous embodiment, the encapsulation compound has the same modulus of elasticity in the first region and in the third region.

The use of the same encapsulation compound for the first region and the at least one third region reduces the production costs because only two encapsulation compounds are required for producing an active part. Also advantageous is the use of an encapsulation compound for all regions, where the encapsulation compound for the second region is provided with an additive.

In a further preferred embodiment, the encapsulation compound located in the second region is enriched with a flexibilizer in a greater concentration than in the first region and in the at least one third region.

A flexibilizer may be a reactive diluent, a softener or another material, which increases the flexibility of an encapsulation compound and/or reduces the modulus of elasticity and/or reduces the brittleness. A different concentration of such a flexibilizer in the encapsulation compound for the second region advantageously causes a reduction of the modulus of elasticity of the encapsulation compound. Thus, the encapsulation compound present in the second region is advantageously enriched with a flexibilizer. Particularly advantageously, an increased concentration of the flexibilizer is incorporated into the encapsulation compound in the region of the slot boundary before the curing process. During the process of curing the encapsulation compound, the flexibilizer is distributed over the second region and forms a Gaussian curve-like distribution in the encapsulation compound.

In polyurethanes, for example, polyols are used as the flexibilizer. The softener and/or flexibilizer serves to alter the flexibility and/or the modulus of elasticity of the encapsulation compound.

In a further advantageous embodiment, the winding projects on two side surfaces of the main body, where a second region surrounds the first region in the region of the side surfaces. In this embodiment, the first region comprises the encapsulation compound inside the main body. The second regions are thus arranged in the region of the slot boundaries of the main body. The third regions are located in the region of the encapsulation compound, by the winding extending outside the main body.

The side surfaces, in particular of the main body, denote the surface of the main body that would cover the recess and/or slot if the recess (slot) were not present in the main body.

Advantageously, the two second regions each cover 0.5 to 5 centimeters along the encapsulation compound around the respective slot boundary.

In a particularly preferred embodiment of the active part, the second region extends around an opening of the main body, where the winding projects from the opening of the main body.

In a further advantageous embodiment, the second region extends around an opening of the recess on the surface, the winding emerging from the main body through said surface. Here, the second region extends along the path of the winding that is surrounded by the encapsulation compound.

The second region is delimited by the boundary of the slot, and/or by the active part and/or by the outer boundary of the encapsulation compound. On front faces of the second region, the second region is delimited by the first region and the third region. The spacing between the front faces, depending on the size of the active part, is a few millimeters to a few centimeters.

In a further advantageous embodiment, the encapsulation compound around the region of slot boundaries of the main body has a different composition (of the encapsulation compound) from that inside the slot of the main body (first region) and/or outside the main body (third region).

As explained above, an active part, in particular a stator or a rotor of an electrodynamic machine, has a winding. The winding is generally located in at least one slot of the main body. The winding in electrical machines generally passes through at least two slots. The main body may be a laminated core. The winding projects out of the main body, in this case on both side faces. The winding in this case extends along the rotational axis of the active part (in particular of the rotor) in the vicinity of the tangential surfaces of the active part. The slot boundaries are each located at the point where the winding in each case leaves the slot of the main body. In each case, the second region extends up to a few millimeters or centimeters (depending on the size of the active part) around the slot boundary in the rotational direction. The third region adjoins the respective second region. The third region extends in the rotational direction as far as the end of the encapsulation material.

The composition of the encapsulation compound is understood as either the proportion of flexibilizer in the encapsulation compound or the type of encapsulation compound itself. The composition may also be slightly altered beyond the region boundaries, such as by mixing in an encapsulation compound having a different composition during the encapsulation.

In one advantageous embodiment, the encapsulation compound comprises an epoxy resin, a silicone encapsulation material, a polyurethane encapsulation material or a plastics material.

In a particularly preferred embodiment, the encapsulation compound is epoxy-based, silicone-based or polyurethane-based.

The encapsulation compound consists, at least to a large proportion, of a thermosetting plastic that is cured after the encapsulation. Epoxy-based, silicone-based or polyurethane-based encapsulation compounds are suitable due to their effective insulation capacity for the encapsulation of the winding of the active part. Generally, the thermal conductivity may be increased by the use of suitable fillers. The winding is fixedly positioned in the slot by the encapsulation compound and also improves the insulation of the individual conductors relative to one another and to the main body.

Advantageously, the aforementioned encapsulation compounds are able to be altered in their mechanical properties by flexibilizers.

With the use of an epoxy resin as the encapsulation compound, a reactive diluent serves as a softener and/or flexibilizer. Low viscous, monofunctional, bifunctional or polyfunctional monomers or oligomers, for example polyethylene glycol or aliphatic glycidyl ether are used as reactive diluents.

In polyurethanes, for example, polyols are used as softeners. The softener and/or flexibilizer serves to alter the flexibility, the modulus of elasticity and/or the toughness of the encapsulation compound.

In a further advantageous embodiment, the encapsulation compound comprises organic and/or inorganic microscale and/or nanoscale fillers.

The fillers and/or particles advantageously serve to increase the electrical insulation of the winding, in particular relative to a metal main body. Furthermore, the particles may contribute to an improved thermal conductivity of the encapsulation material.

Metal oxides or other organic oxides, in particular mica or silicon dioxide are suitable as inorganic material. Before applying the encapsulation compound, the winding may also advantageously be surrounded with a further insulating layer, such as a mica tape.

It is also conceivable that the encapsulation compound in the second region consists of a different material from the encapsulation compound in the first region and/or the at least third region and that the encapsulation compound is selected using the inorganic particles.

For example, an epoxy resin, admixed with inorganic particles for improved electrical insulation if required, may be used in the first region, an epoxy resin (without inorganic particles) may be used in the third region and a different resin having a reduced hardness/brittleness or increased resilience may also be used in the second region. In principle, most combinations of encapsulation compounds are possible, where the combinations have no unforeseen chemical reactions with one another or do not form any adverse boundary surfaces.

In one advantageous embodiment, the main body is a laminated core. A main body of an electrical machine, which has at least one winding, often has a laminated core. The laminated core serves to reduce undesired components of the magnetic field that is produced by the (current-carrying) winding.

Relative to the embodiment in accordance with the invention of the encapsulation compound, an encapsulation compound as described above adheres well to a laminated core.

One possibility for producing the active part is advantageously in that an encapsulation compound is passed through openings in at least one slot in the active part, in particular between the winding and a main body, where the composition of the encapsulation compound is altered when passed through.

In one advantageous embodiment of the method, a first encapsulation compound is initially passed through the openings in the active part. Subsequently, at least one further encapsulation compound is passed through the openings.

Such a method for encapsulation of the active part, in particular the winding that is positioned in the main body, has the advantage that it can be performed very easily and can also be implemented via simple tools/instruments that are already present.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Hereinafter, the invention is described and explained further using the figures. In this case, features are disclosed in the individual embodiments which the person skilled in the art may implement individually or combine to form new embodiments. The embodiments shown are relative to a stator and/or a rotor. The person skilled in the art may, however, easily transfer these features to other fields of application set forth above, without departing from the scope of the invention, in which.

DETAILED DESCRIPTION OF THE EXEMPLARY EMBODIMENTS

Figure 1:
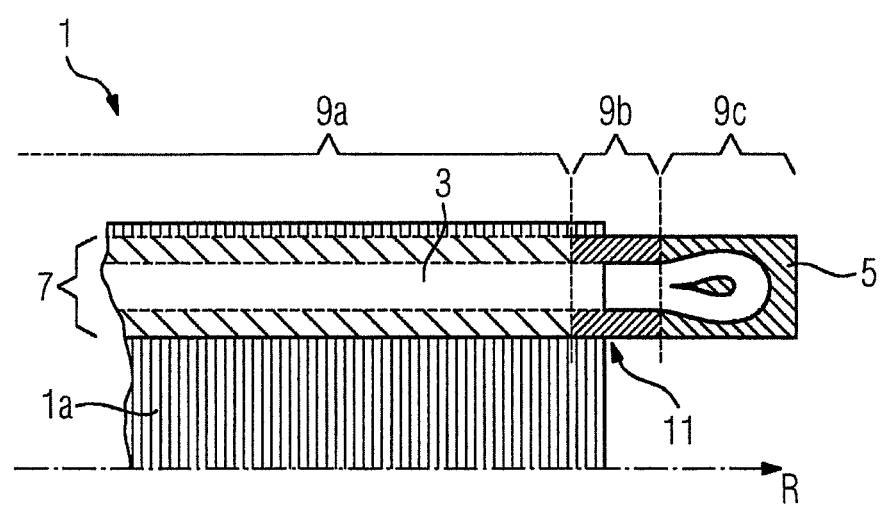
FIG. 1 shows a detail of an active part in the axial direction in accordance with the invention.

FIG. 1 shows a detailed sectional view of an active part 1, 2, in particular of a rotor 1. In the main body 1a in the upper region parallel to the rotational axis R, a winding 3 is integrated in a slot 7 or a recess. The winding 3 fills a large part of the slot 7 and/or the recess of the main body (1a). The winding 3 is surrounded both in the slot 7 and in the portion protruding over the main body 1a by an encapsulation compound 5. The encapsulation compound 5 has been introduced into the region of the slot 7 or the recess of the main body 1a. In the rotational direction R, the winding 3 embedded in the encapsulation compound 5 is divided into a first region 9a (in the inside of the laminated core 1a), into a second region 9b in the region of one side of the laminated core 1a and into a third region 9c (outside the laminated core 1a). A rotor 1 (as the active part) has at least one such winding 3. The slot 7 is at least sufficiently deep that the winding is fixed by the encapsulation compound 5 so as to be located in the slot 7 in the radial direction relative to the rotational axis R. Advantageously, but not shown explicitly, a further channel may be present in the slot/recess. The channel may contribute, for example, to improved penetration of the winding 3 by the encapsulation compound 5. A laminated core 1a is shown here as the main body 1a.

Figure 2:
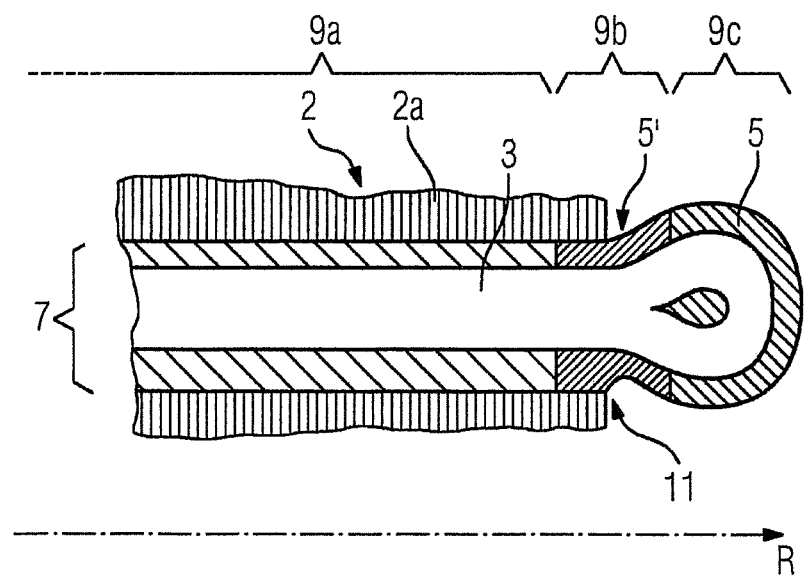
FIG. 2 shows a further detail of an active part in the axial direction in accordance with the invention.

FIG. 2 shows a further detail of an active part 1, 2 (stator) in the axial direction. The winding embedded in the encapsulation compound 5 is shown on the lower face of the laminated core 2a. The winding embedded in the encapsulation compound 5, 5' is divided into three regions: a first region 9a, a second region 9b and a third region 9c. The first region 9a is located in the interior of the laminated core 2a. The second region 9b is the region at which the winding 3 emerges from the laminated core 2a. The third region 9c of the winding 3 embedded in the encapsulation compound is located outside the laminated core 2a.

The encapsulation compound 5' in the second region 9b has a different composition from that of the encapsulation compound 5 in the first region 9a and/or the third region 9c.

The encapsulation compound 5', in particular in the second region 9b, advantageously has a lower modulus of elasticity EM than that of the encapsulation compound 5 in the first region 9a and optionally also a different modulus of elasticity EM from that of the encapsulation compound 5 in the third region 9c.

Advantageously, the encapsulation compound 5, 5' may further comprise inorganic particles, where the inorganic particles contribute to improved insulation of the winding 3. In order to economize on inorganic particles, such as mica, metal oxides or the like, it is possible that only the encapsulation compound 5' that is located in the vicinity of the slot boundary 11 is enriched with inorganic particles.

In a laminated core 1a, 2a for a rotor 1 or a stator 2 of a dynamo-electric machine, the winding 3, i.e., the winding 3 embedded in an encapsulation compound 5, 5', also projects partially outwards on the other side of the laminated core 1a, 2a. For improved clarity, however, this is not shown in the details of FIG. 1 and FIG. 2.

Figure 3:
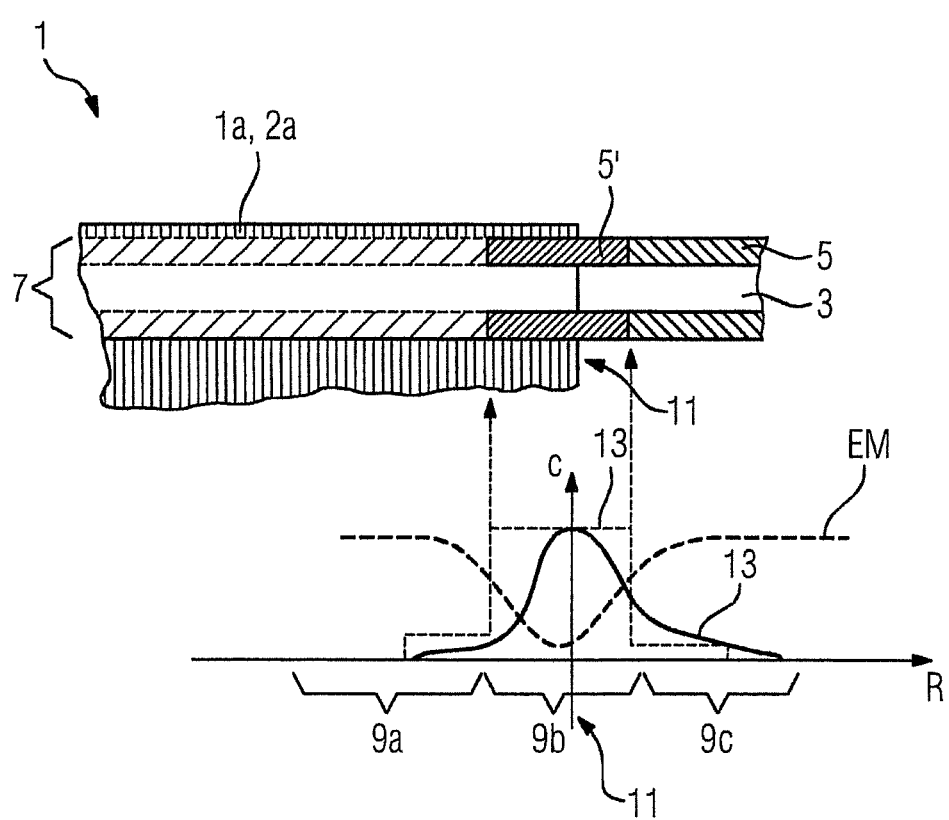
FIG. 3 shows a schematic construction of an active part and a path of a concentration of a flexibilizer in accordance with the invention.

FIG. 3 shows a schematic construction of an active part 1, 2 and a path of a concentration c of a flexibilizer F. The flexibilizer F serves to reduce the brittleness and/or the modulus of elasticity of the encapsulation compound 5 in the second region 9b. The section of the part of the active part 1, 2 is shown at the top. In the lower region of FIG. 3, possible concentrations c of the flexibilizer F, and thus of the (reduced) toughness/the (reduced) modulus of elasticity 13 of the encapsulation compound 5 extending proportionally, are shown as a function of the location in the rotational direction R. The plane, through which the winding 3 emerges from the main body 1a, 2a of the active part 1, 2, is the slot boundary 11. The slot boundary 11 is located approximately over half the width (in the rotational direction) of the second region 9b. The first region 9a adjoins the one side of the second region 9b. The third region 9c adjoins the respective other side of the second region 9b. In the schematic construction of the active part 1, 2 (upper part of FIG. 3), it is shown that the winding 3 is surrounded by the encapsulation compound 5. In the first region 9a, the encapsulation compound 5 is at least partially surrounded by the main body 1a, 2a. The winding 3 and the encapsulation compound 5 emerge from the main body 1a, 2a at the slot boundary 11.

The Gaussian curve-shaped path of the (reduced) toughness 13 in the individual regions 9a, 9b, 9c corresponds to the path of the (reduced) modulus of elasticity EM. The other path 13' of the toughness 13' shows a further possible stepped path of the toughness 13'. The path of the toughness 13, 13' corresponds to the path of the concentration c of the flexibilizer.

The two parts of FIG. 3 are arranged such that the individual regions 9a, 9b, 9c also correspond to the individual regions 9a, 9b, 9c in the encapsulation compound 5 of the active part 1, 2 itself. This is symbolized by the upwardly facing arrows.

Figure 4:
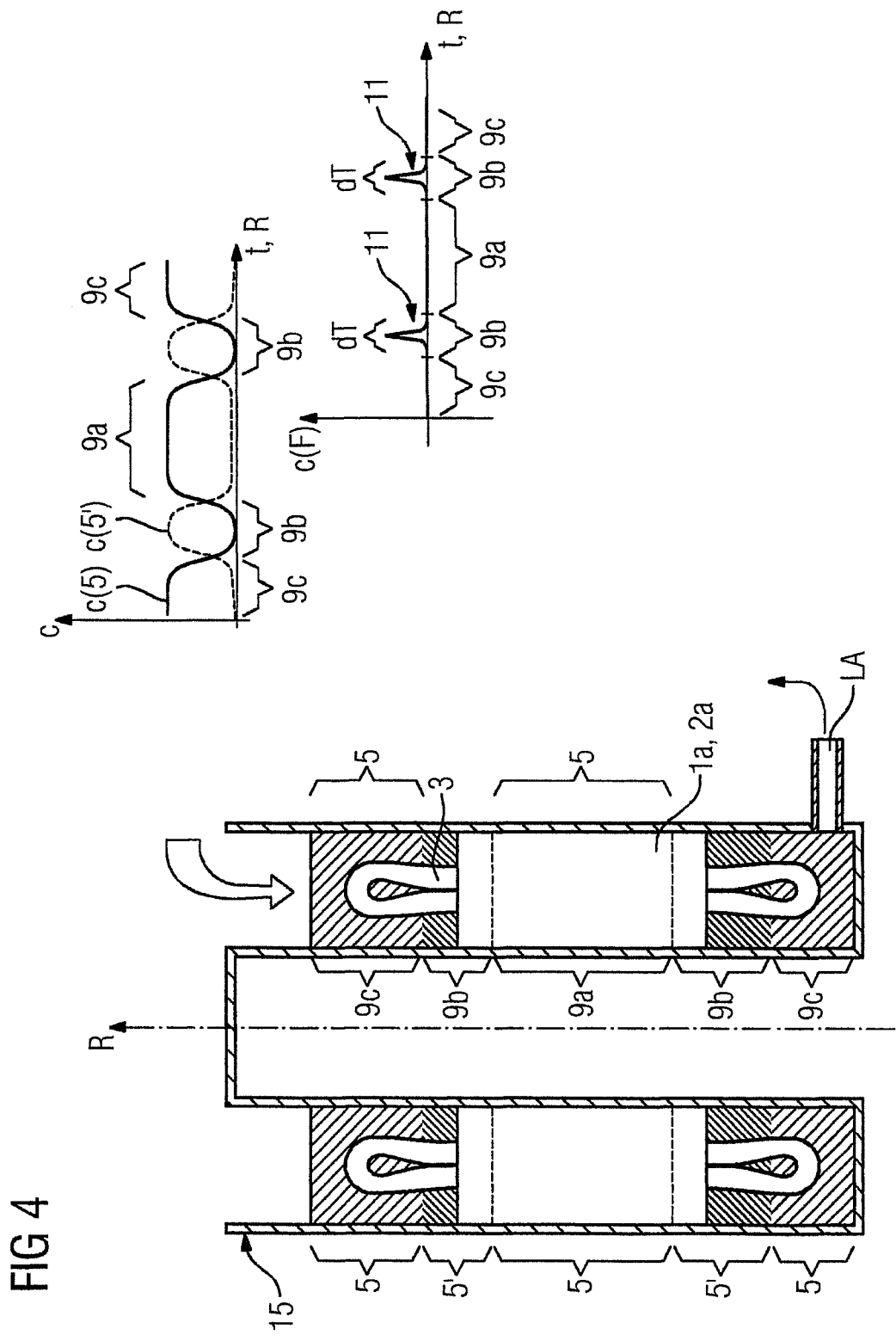
FIG. 4 shows a device for producing an active part.

FIG. 4 shows a device for producing an active part 1, 2. In particular, the figure shows the process of encapsulating the windings 3 with at least one encapsulation compound 5, 5'.

To this end, the main body 1a, 2a is positioned in a container 15, where the container 15 is shaped to correspond to the profile of the main body 1a, 2a and/or the active part 1, 2. For a stator 2 of a dynamo-electric machine the container 15 as shown is a hollow cylinder. The hollow cylinder in this case is shown in section. The hollow cylindrical container 15 may also have a narrowed portion on at least one side. The cavity of the container 15 advantageously serves for receiving the main body 1a, 2a. R denotes in this case the rotational axis of the active part 1, 2.

For the encapsulation of the active part 1, 2, the main body 1a, 2a is positioned with the winding 3 in the container 15. Then from the top (or bottom), encapsulation compound 5 is introduced in the uncured state into the container 15. The uncured encapsulation compound 5, 5' then passes through the (continuous) cavities between the main body 1a, 2a and the winding 3 and the cavities between the individual conductors of the winding 3.

The container is provided with an air outlet LA. The air outlet LA may also be connected to a vacuum pump. The vacuum pump then removes the air from the container so that the (not yet cured) encapsulation compound 5 flows more easily through the aforementioned cavities.

For an active part described here, firstly the encapsulation compound 5 that is provided for the third region 9c is filled in. Optionally, the encapsulation compound 5 is initially cured at least partially in the third region 9c.

Subsequently, the encapsulation compound 5' for the second region 9b is filled in. The encapsulation compound 5' for the second region may either be a different encapsulation compound 5' from the encapsulation compound for the third region 9c and/or for the first region 9a or the same encapsulation compound 5 with a flexibilizer F. This encapsulation compound 5' may also be at least partially cured. Then the encapsulation compound 5 for the first region 9a is filled in. Subsequently, the encapsulation compound 5 that is located in the first region 9a may be cured as required. Then in accordance with the above-described schedule, the encapsulation compound 5' for the second region 9b is filled in and optionally cured if required. Finally, the encapsulation compound 5 for the (other) third region 9c is filled in. After filling in the encapsulation compounds 5, 5' the encapsulation compounds 5, 5' may be cured.

The encapsulation compounds 5, 5' are advantageously filled in through a conduit. If a flexibilizer is added to the encapsulation compound, a mixing container may be used before introducing the encapsulation compounds 5, 5'.

The encapsulation compound 5 for the first region 9a and/or for the third region 9c is, for example, advantageously an epoxy-based, silicone-based or polyurethane-based encapsulation compound. Curing may occur by the action of heat or by a radiation-assisted chemical reaction.

The encapsulation compound 5' for the second region is, for example, an encapsulation compound with an increased proportion of a flexibilizer F. In the time ranges dT, instead of the encapsulation compound 5 a different encapsulation compound 5' may be filled into the container 15. Here, in the time ranges dT, the encapsulation compound 5' for the second regions 9b is introduced into the container 15.

Advantageously, in a time range dT, the flexibilizer F may also be filled into the container 15 instead of the encapsulation compound or in a mixture with the encapsulation compound 5. In this case the time ranges dT may be selected, such that the flexibilizer F at the slot boundary 11 has the greatest concentration c, c(F). This is shown in the lower diagram.

The two diagrams on the right-hand side show the paths of the different concentrations as a function of the time t (the filling time) and/or the filling state of the encapsulation compounds 5, 5' in the container.

In the upper diagram, the concentration c(5), c(5') of the encapsulation compounds 5, 5' are plotted as a function of the time and/or the filling state of the encapsulation compounds. As a function of the filling state/the filling height of the encapsulation compounds 5, 5', initially the encapsulation compound 5 with a high modulus of elasticity EM, is filled into the container. The encapsulation compound 5 with the high modulus of elasticity EM is filled in until the filling state is reached which corresponds to the third region 9c. An encapsulation compound 5' or a mixture of encapsulation compounds 5, 5' is then filled in, where the modulus of elasticity EM, in particular at the slot boundary 11, adopts a lower value. The encapsulation compound 5 or the mixture of encapsulation compounds 5, 5' is filled into the container 15 as far as a filling state that corresponds to the second region 9b. An encapsulation compound 5, 5' with a higher modulus of elasticity EM may then be filled in again. The encapsulation compound 5, 5' with the higher modulus of elasticity EM is filled in until the filling state exceeds the first region 9a. Subsequently, in the second region 9b the encapsulation compound with the lower modulus of elasticity EM is filled in again until the filling state reaches the end of the second region 9b and the same occurs with the encapsulation compound 5 with the higher modulus of elasticity EM for the third region 9c.

In one feature, the invention relates to an active part 1, 2, in particular a rotor 1 or a stator 2, of an electrical machine.

The active part 1, 2 has a main body 1a, 2a, in particular a laminated core 1a, 2a. In the main body 1a, 2a (at least one) winding 3 is integrated. In at least one region 9b, 9c, in particular a third region 9c, the windings 3 are not surrounded by the main body 1a, 2a. The windings 3 extend at least partially in an encapsulation compound 5, 5'. The encapsulation compound 5, 5' is also connected to the main body 1a, 2a. For improving the durability of the active part 1, 2, in particular in the case of loading when the active part 1, 2 is periodically heated, it is proposed to alter partially the toughness and/or the modulus of elasticity EM of the encapsulation compound 5, 5'. In particular, with a reduction of the modulus of elasticity EM in the second region 9b where a thermal expansion of elements of the active part 1, 2 leads to mechanical loading of the active part 1, 2, an encapsulation compound 5, 5' with a reduced modulus of elasticity EM is advantageous. To this end, an encapsulation compound 5, 5' with a reduced modulus of elasticity EM is preferably positioned in a second region 9b that is located between a first region 9a and respectively a third region 9c, in particular in the region of the slot boundary 11.

In summary, the invention relates to an active part 1, 2, such as a rotor 1 or a stator 2, and an electrical machine comprising such an active part 1, 2. The active part 1, 2 has a main body 1a, 2a and a winding 3, where the winding 3 is surrounded by an encapsulation compound 5, 5', where the encapsulation compound 5, 5' comprises at least three regions 9a, 9b, 9c, where the winding 3 extends in a first region 9a in a slot 7 through the main body 1a, 2a, and where the winding 3 surrounded by the encapsulation compound 5, 5', at least in a third region 9c, projects from the main body 1a, 2a. For improving the active part 1, 2, at least one second region 9b is provided between the first region 9a and the third region 9c, where the encapsulation compound 5, 5' in the second region 9b has a different composition from that in the first region 9a and/or the third region 9c.

Figure 5:
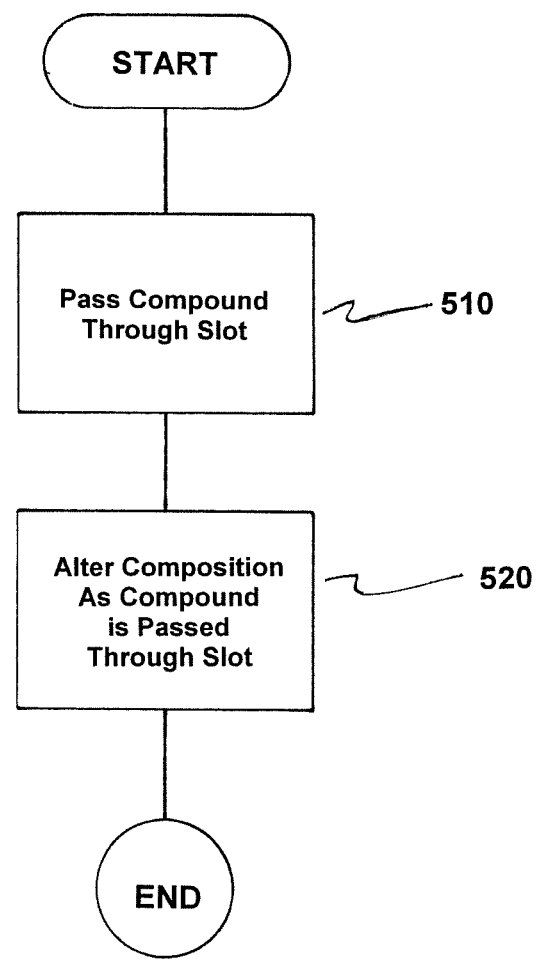
FIG. 5 is a flowchart of the method in accordance with the invention.

FIG. 5 is a flowchart of a method for producing an active part. The method comprises passing an encapsulation compound (5, 5') encompassing a winding (3) through a slot (7) of a main body (1a, 2a), as indicated in step 510.

Next, the composition of the encapsulation compound (5, 5') in the first, second and third regions (9a, 9b, 9c) of the encapsulation compound (5, 5') is altered when the encapsulation compound (5, 5') is passed through the slot (7) of the main body (1a, 2a), as indicated in step 520.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An active part of an electrical machine, comprising:
a main body; and
a winding surrounded by an encapsulation compound, said encapsulation compound including at least three regions, and said winding extending through the main body in a slot within a first region, projecting out of the main body at least in a third region, at least one second region being arranged between the first region and the third region;
wherein the encapsulation compound has a different composition in the second region from the encapsulation compound in at least one of (i) the first region and (ii) the third region; and
wherein the encapsulation compound located in the second region is enriched with a flexibilizer at a greater concentration level than in the first region and in the third region.

2. The active part as claimed in claim 1, wherein the encapsulation compound in the second region has a different modulus of elasticity from a modulus of elasticity in at least one of (i) the first region and (ii) the third region.

3. The active part as claimed in claim 2, wherein the encapsulation compound in the second region has a different toughness from a toughness in at least one of (i) the first region and (ii) the third region.

4. The active part as claimed in claim 2, wherein the encapsulation compound in the second region has a reduced modulus of elasticity from a modulus of elasticity of encapsulation compounds in at least one of (i) the first region and (ii) the third region.

5. The active part as claimed in claim 1, wherein the encapsulation compound in the second region has a different toughness from a toughness in at least one of (i) the first region and (ii) the third region.

6. The active part as claimed in claim 1, wherein the encapsulation compound in the second region has a reduced modulus of elasticity from a modulus of elasticity of encapsulation compounds in at least one of (i) the first region and (ii) the third region.

7. The active part as claimed in claim 1, wherein the encapsulation compound has the same modulus of elasticity in the first region and in the third region.

8. The active part as claimed in claim 1, wherein the winding projects on two sides of the main body and wherein there are two second regions and the second regions adjoin the first region on the two sides of the main body.

9. The active part as claimed in claim 1, wherein the second region extends around an opening of the main body; and wherein the winding projects from the opening of the main body.

10. The active part as claimed in claim 1, wherein the encapsulation compound comprises one of (i) an epoxy resin, (ii) a silicone encapsulation material, (iii) a polyurethane encapsulation material and (iv) a plastics material.

11. The active part as claimed in claim 1, wherein the encapsulation compound comprises at least one of (i) an organic filler (ii) an inorganic microscale filler and (iii) a nanoscale filler.

12. The active part as claimed in claim 1, wherein the main body comprises a laminated core.

13. The active part as claimed in claim 1, wherein the active part is one of (i) a rotor and (ii) a stator.

14. The active part as claimed in claim 1, wherein the stator comprises the active part.

15. The active part as claimed in claim 1, wherein the rotor comprises the active part as claimed in claim 1.

16. An electrical machine comprising at least one active part as claimed in claim 1.

17. The electrical machine of claim 16, wherein the electrical machine comprises a dynamo-electric machine.

18. The electrical machine of claim 16, wherein the at least one active part comprises one of (i) a stator and (ii) a rotor.

19. A method for producing an active part of an electrical machine, comprising a main body, and a winding surrounded by an encapsulation compound, said encapsulation compound including at least three regions, and said winding extending through the main body in a slot within a first region, projecting out of the main body at least in a third region, at least one second region being arranged between the first region and the third region, the encapsulation compound having a different composition in the second region from the encapsulation compound in at least one of (i) the first region and (ii) the third region, and the encapsulation compound located in the second region being enriched with a flexibilizer at a greater concentration level than in the first region and in the third region, the method comprising:
passing the encapsulation compound encompassing the winding through the slot of the main body; and altering the composition of the encapsulation compound in the first, second and third regions of the encapsulation compound when said encapsulation compound is passed through the slot of the main body.

\* \* \* \* \*